US010545250B2

(12) United States Patent
Abel et al.

(10) Patent No.: US 10,545,250 B2
(45) Date of Patent: Jan. 28, 2020

(54) MICROSEISMIC EVENT LOCALIZATION USING BOTH DIRECT-PATH AND HEAD-WAVE ARRIVALS

(71) Applicant: Seismic Innovations, Menlo Park, CA (US)

(72) Inventors: Jonathan S. Abel, Menlo Park, CA (US); Sean A. Coffin, Redwood City, CA (US)

(73) Assignee: SEISMIC INNOVATIONS, Menlo Park, CA (US)

( * ) Notice: Subject to any disclaimer, the term of this patent is extended or adjusted under 35 U.S.C. 154(b) by 694 days.

(21) Appl. No.: 14/536,985

(22) Filed: Nov. 10, 2014

(65) Prior Publication Data

US 2015/0057937 A1    Feb. 26, 2015

Related U.S. Application Data

(63) Continuation-in-part of application No. PCT/US2013/040191, filed on May 8, 2013.

(60) Provisional application No. 61/644,337, filed on May 8, 2012.

(51) Int. Cl.
*G01V 1/30* (2006.01)
*G01V 1/28* (2006.01)
*G01V 1/40* (2006.01)

(52) U.S. Cl.
CPC .......... *G01V 1/30* (2013.01); *G01V 1/40* (2013.01); *G01V 1/28* (2013.01); *G01V 1/288* (2013.01); *G01V 2210/123* (2013.01); *G01V 2210/129* (2013.01); *G01V 2210/612* (2013.01)

(58) Field of Classification Search
None
See application file for complete search history.

(56) References Cited

U.S. PATENT DOCUMENTS

| 7,391,675 B2 | 6/2008 | Drew |
| 2005/0060099 A1 | 3/2005 | Sorrells et al. |
| 2009/0010104 A1 | 1/2009 | Leaney |
| 2010/0312480 A1 | 12/2010 | Hansteen et al. |
| 2011/0317518 A1 | 12/2011 | Guigne et al. |
| 2013/0215717 A1 | 8/2013 | Hofland et al. |
| 2014/0112099 A1 | 4/2014 | Hofland et al. |

(Continued)

FOREIGN PATENT DOCUMENTS

| EP | 1 485 733 B1 | 12/2011 |
| EP | 2 784 552 A2 | 10/2014 |
| GB | 2 525 996 A | 11/2015 |

OTHER PUBLICATIONS

Ulrich Zimmer, "Microseismic design studies," Geophysics, vol. 76, No. 6, Nov.-Dec. 2011, pp. WC17-WC25.*

(Continued)

*Primary Examiner* — Hoang-Quan T Ho
*Assistant Examiner* — Aneta B Cieslewicz
(74) *Attorney, Agent, or Firm* — Foley & Lardner LLP

(57) ABSTRACT

The present invention relates to methods and apparatuses for using head waves to greatly improve microseismic event localization accuracy, particularly in the depth dimension, by analyzing them in addition to direct path arrivals whenever they are observed. Embodiments of the invention also include techniques known as multipath analysis.

9 Claims, 15 Drawing Sheets

(56) References Cited

U.S. PATENT DOCUMENTS

2014/0278120 A1    9/2014  Kahn et al.

OTHER PUBLICATIONS

Bahorich, et al., "3-D Seismic Discontinuity for Faults and Stratigraphic Features: The Coherence Cube", The Leading Edge, Oct. 1995, pp. 1053-1058.
Chopra, et al., "Curvature Attributes Delineate Subtleties", E & P, Sep. 2006, pp. 72-73.
Fuller, et al., "Seismic Wave Phenomena and Implications for Accuracy of Microseismic Results", CSEG Recorder, Nov. 2010, pp. 36-37.
Roth, et al., "Fracture Interpretation in the Barnett Shale, Using Macro and Microseismic Data", Frontiers and Innovation—CSPG CSEG SWLS Convention, 2009, pp. 1-4.
International Search Report and Written Opinion dated Sep. 25, 2013 in parent PCT/US13/040191.
Abel et al., "An Analytic Model for Microseismic Event Location Estimate Accuracy", First Break, 19.
Culver et al., "Interpretation of Multipath-Analysis Localizations of Microseismic Data: An Alberta Montney Shale Example", undated white paper, 5 pages.
Hur, et al., "An Analytic Model for Microseismic Event Location Estimate Accuracy", First Break, undated, 6 pages.
Zimmer, et al., "Localization of Microseismic Events Using Headwaves and Direct Waves", SEG Expanded Abstracts 2010, pp. 2196-2200.

\* cited by examiner

MICROSEISMIC EVENT LOCALIZATION USING BOTH DIRECT-PATH AND HEAD-WAVE ARRIVALS

CROSS-REFERENCE TO RELATED APPLICATIONS

This application is a continuation-in-part of PCT/US2013/040191, filed May 8, 2013, which claims the benefit of Provisional Patent Application Ser. No. 61/644,337, filed May 8, 2012, each of which is hereby incorporated by reference in its entirety.

FIELD OF THE INVENTION

The present invention relates generally to characterizing microseismic events, and more particularly to microseismic event localization using both direct-path and head-wave arrivals.

BACKGROUND OF THE RELATED ART

Several techniques have been developed in recent years for the automatic detection and localization of microseismic events associated with hydraulic fracturing treatments in unconventional resource plays, providing large advancements in the reliability of microseismic analysis. However, these modern techniques are still adversely affected by the presence of multipath arrivals of microseismic energy. In many unconventional shale plays, the resource bearing layer is located immediately above and/or below a more dense, high-velocity layer that gives rise to complex wave propagation where energy from a single microseismic event will reach an array of geophones near target depth through multiple indirect propagation paths such as reflections and head waves. If not correctly identified and analyzed, these indirectly arriving wavefronts can cause false positive detection of additional events believed to originate across the layer interfaces that generate them (see B. Fuller et al., Seismic wave phenomena and implications for accuracy of microseismic results, Recorder, 2010). Additionally, since head waves are radiated by critically refracted waves that travel at a higher velocity than the direct path for events occurring within the target layer, they can arrive either before or after the direct-path wavefront, depending on a source's distance from the monitoring array. This property of head waves can cause further complications for standard analysis techniques, which typically look to only the first arrival associated with any particular microseismic event.

Previous discussions of these multipath complications have typically suggested designing monitoring arrays to avoid head waves and other indirect-path arrivals (see B. Fuller et al., Seismic wave phenomena and implications for accuracy of microseismic results, Recorder, 2010; U. Zimmer, Localization of microseismic events using headwaves and direct waves, SEG Expanded Abstracts, 2010). More recent discussions of head waves in microseismic analysis have begun to address combining earlier arriving head waves with later direct-path arrivals during localization for improved accuracy (U. Zimmer, Localization of microseismic events using headwaves and direct waves, SEG Expanded Abstracts, 2010; Microseismic design studies, Geophysics, 2011), but have not addressed the combination of these two arrival types in general and have assessed the benefit of their combination only through travel-time-residual analysis, which obscures the underlying localization geometry and fails to provide an intuitive understanding of the associated effects on accuracy.

Relatedly, many important unconventional shale assets are hosted within regions where geological formations near the target layer create multiple paths through which the energy from a single microseismic event can reach an array of geophones positioned near target depth. These indirect arrivals, which include reflections and head waves, have traditionally been viewed as a nuisance in microseismic analysis, potentially causing additional false-positive event detections and erroneous localizations into the layers which generate them. In particular, the effects and potential use of head waves in microseismic analysis have been studied recently (see B. Fuller et al., Seismic wave phenomena and implications for accuracy of microseismic results, Recorder, 2010; U. Zimmer, Localization of microseismic events using headwaves and direct waves, SEG Expanded Abstracts, 2010; Challenges and solutions in locating and interpreting microseismic events from surveys in the Horn River Basin, CSPG CSEG CWLS Convention, 2011; Microseismic design studies, Geophysics, 2011); however, these studies have focused on presurvey design to avoid observing head waves and have discussed the use of direct-path and head-wave arrivals in combination for event localization only in limited cases.

For example, typical microseismic processing techniques aim to analyze only the first or direct-path arrivals of microseismic event energy during localization. This approach affords limited event depth estimation accuracy in surveys where the source-to-receiver-array distances are large, due to typically small relative array apertures, and is adversely affected by the presence of multiple, indirect-path arrivals. Such arrivals, including mode conversions, reflections and head waves, are generated whenever geological formations of contrasting propagation velocity exist near the target layer. In particular, the presence of high-velocity formations near the target layer will give rise to head waves—plane waves that are radiated back into the lower-velocity target formation by critically refracted wavefronts traveling along the interface between the two layers at the higher speed. Such geological arrangements are typical in many unconventional shale plays, including the Montney in Alberta, Canada, which is bounded below by the high-velocity Belloy formation. Improper identification and analysis of these head waves can cause gross localization errors of microseismic events across the head-wave-generating interface and into the high-velocity layer.

SUMMARY OF THE INVENTION

The present invention relates to methods and apparatuses for using head waves to greatly improve microseismic event localization accuracy, particularly in the depth dimension, by analyzing them in addition to direct path arrivals whenever they are observed. Embodiments of the invention also include techniques known as multipath analysis.

In accordance with these and other aspects, a method for localizing an event producing microseismic energy arriving at an array of sensors according to embodiments of the invention includes receiving data corresponding the microseismic energy at one or more sensors of the array, identifying a direct wave arrival of the event in the data, and identifying a head wave arrival of the event in the data.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present inventors have explored microseismic event localization using both direct-path and head-wave arrivals. In embodiments, head-wave geometry is examined to evaluate the improved accuracy of these multiple-arrival based localizations through the application of a probabilistic framework based on the information inequality, or Cram'er-Rao bound, originally described in U.S. application Ser. No. 13/598,580, the contents of which are incorporated by reference herein in their entirety.

According to some aspects, the present inventors recognize that head-wave arrival times provide event location information along directions not well constrained by the direct arrivals alone in typical survey geometries, causing their inclusion in microseismic event localization to greatly improve accuracy, particularly in the depth dimension. In the examples below, the present inventors demonstrate this increase in localization accuracy on a data set taken from the Montney formation by presenting localization results and both with and without the incorporation of head-wave information.

Figure 1:
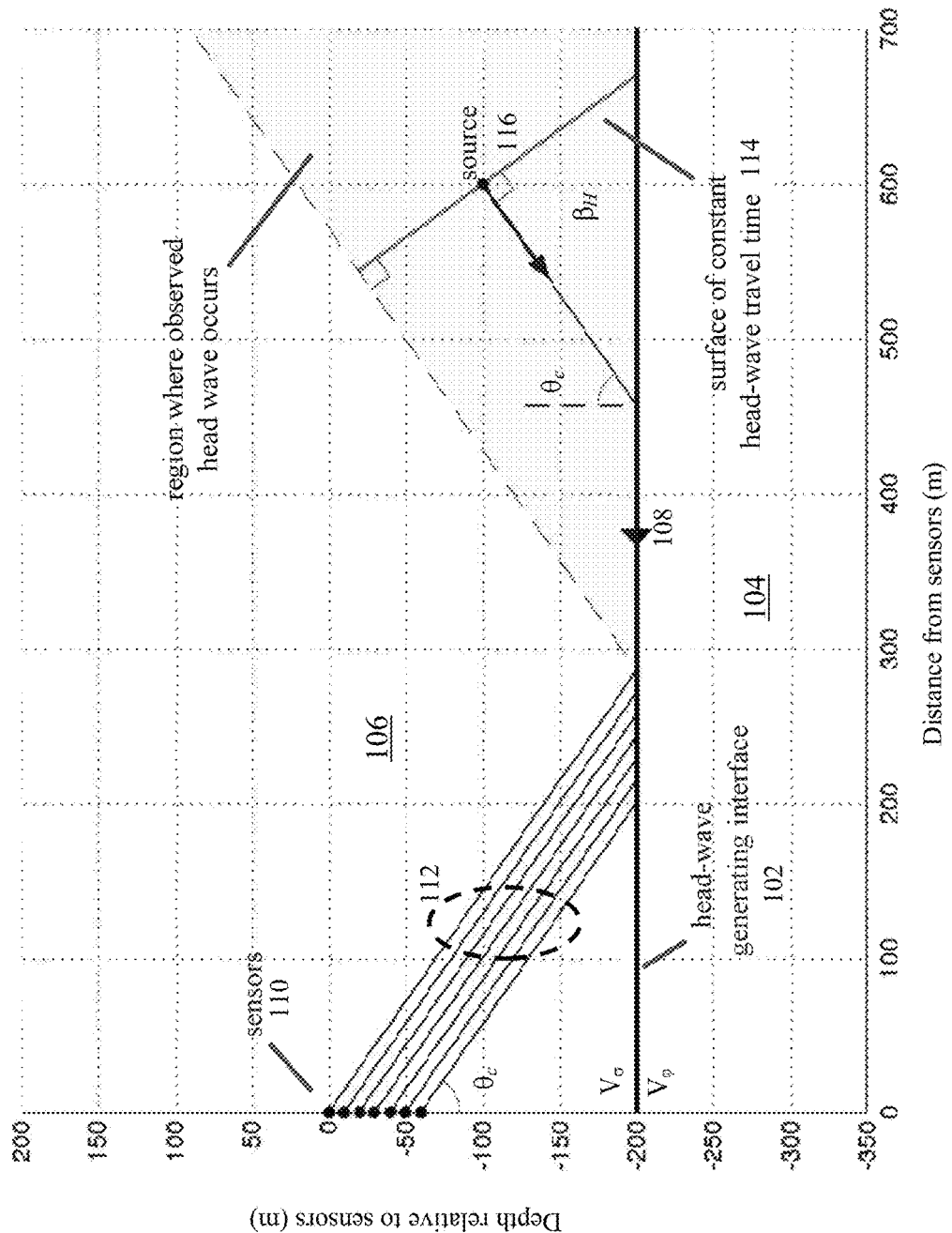
FIG. 1 illustrates a portion of the wavefront created by a microseismic event that hits an interface with a higher-velocity layer at the critical angle, $\theta_c$.

For ease of illustration, but without limiting the invention, the present discussion is limited to the simplified case of a vertical sensor array and an isotropic, laterally homogeneous propagation medium with only two layers: a layer with slower propagation speed vu bounded below by a layer having a faster propagation speed v$\varphi$, as seen in FIG. 1. Because of the azimuthal symmetry of this setting, discussions herein will often be restricted to a vertical plane containing both the array and a potential source location. Finally, it is assumed that a single P-to-S velocity ratio is common to both layers, and that all sensors are located within the slower layer. Although these simplifications are made here for clarity of presentation, it should be noted that this does not limit the invention, and the developed intuitions and expressions are readily extended to the general case.

Head-Wave Geometry

Head waves occur when a wavefront originating in a lower-velocity layer reaches an interface with a higher-velocity layer at the interface's critical angle, $$\theta_c = \arcsin(v_\sigma/v_\varphi), \quad (1)$$

causing the incoming wavefront to be refracted exactly along the interface of the two layers ($v_\sigma$ is velocity in the lower-velocity layer and $v_\varphi$ is velocity in the higher-velocity layer). This critically-refracted portion of the wavefront then travels just within the high-velocity layer at the higher speed, continually radiating an additional wavefront, termed a head wave, back into the lower-velocity layer at the critical angle, as illustrated in FIG. 1. This path dictates that a source must be within a particular region of space for a head wave to be observed at the sensor array 110, also shown in FIG. 1. More particularly, FIG. 1 shows that a portion of the wavefront created by a microseismic event hits an interface 102 between a higher-velocity layer 104 and a lower-velocity layer at the critical angle, $\theta_c$. It then travels a critically-refracted path along the interface, as indicated by the arrow 108, radiating a head wave back into the lower-velocity layer 106 in the form of a plane wave 112 traveling at the critical angle.

For a head wave arriving at a sensor 110, the travel time from the source, $\tau_H$, may be computed by separately considering the three segments of the associated propagation path as $$\tau_H = \frac{\cos\theta_c}{v_\sigma}(\xi_2 + x_2) + \frac{\sin\theta_c}{v_\sigma}|\xi_1 - x_1|, \quad (2)$$

where $\xi$ denotes the source position and x denotes the geophone position, with their horizontal and vertical components denoted by the subscripts 1 and 2, respectively, and the vertical component being measured as height above the interface.

The travel time $\tau_H$ is linear in the source position, such that a horizontal displacement of the source away from the sensor may be compensated by a proportional vertical displacement closer to the fast layer in a way that leaves the total travel time unchanged. This is illustrated in FIG. 1, where the locus of source positions producing the depicted head-wave travel times is shown as a line segment 114 with inclination orthogonal to the critical angle $\theta_c$. In three dimensions, this line segment may be rotated about the vertical array to produce a cone segment that describes the set of all source positions corresponding to the depicted head-wave travel times. The difference in S-head-wave and P-head-wave arrival times, denoted $\delta_H(\xi)$, is similarly linear in source position, and thus the set of all source positions producing a particular head-wave arrival time difference is also given by this type of cone segment.

Localization Accuracy Improvement

Figure 2:
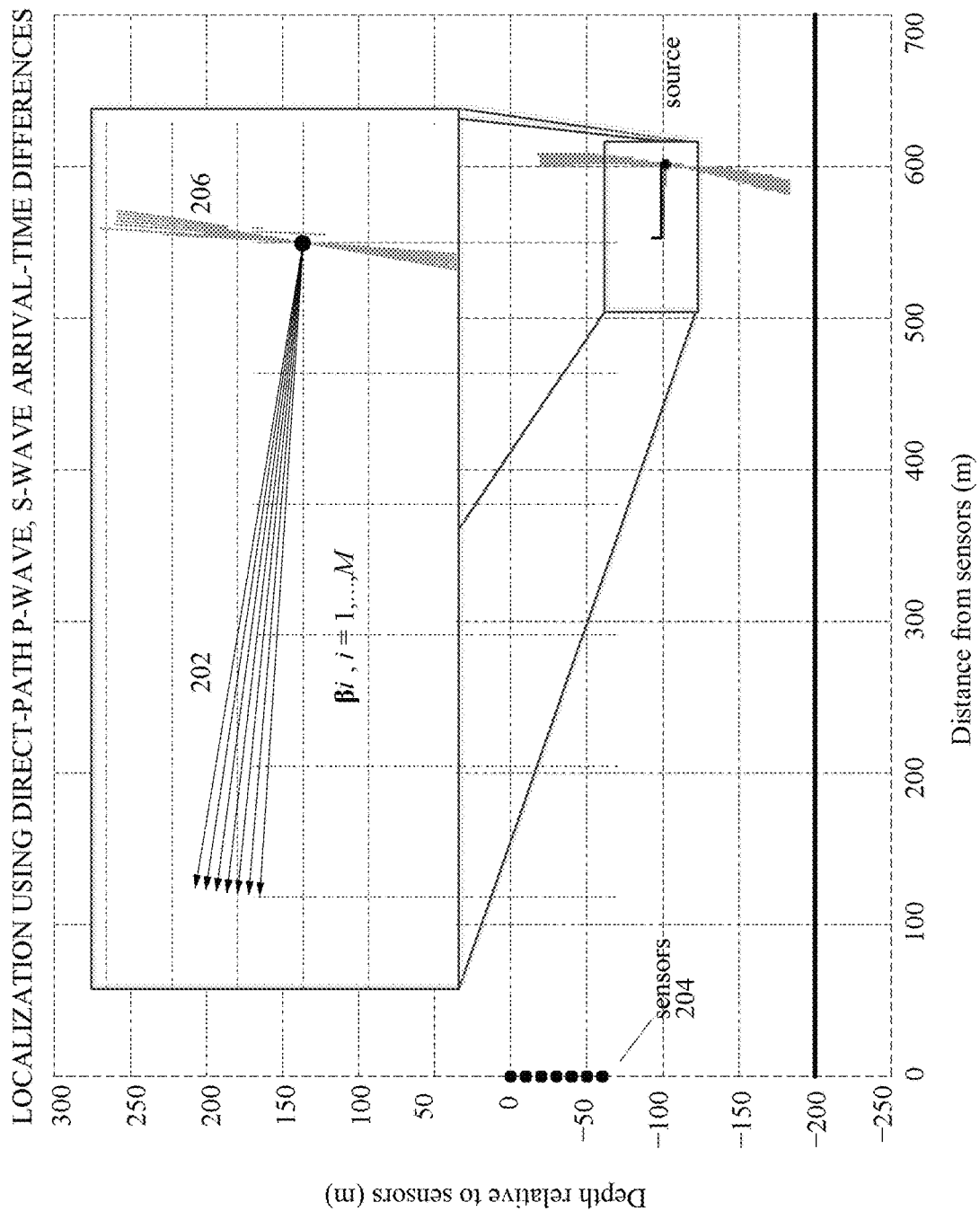
FIG. 2 illustrates that for sources at distances several times the vertical aperture of an array, all source-sensor direction cosine vectors, $\beta_i$, associated with direct waves point in nearly the same direction.

For a given source location $\xi$, it was demonstrated in U.S. application Ser. No. 13/598,580 that the matrix for the Fisher information contained in the set of direct-path P-S arrival-time differences observed at an array of M sensors, denoted $\delta_D$, is given by $$J_\xi(\delta_D) = ESNR_D \sum_{m=1}^{M} \beta_m \beta_m^T, \quad (3)$$

where $ESNR_D$ is the direct-path effective signal-to-noise ratio—the sum of the signal-derivative energy to background-noise energy ratios for P waves and S waves, each scaled by their respective slow layer propagation speeds, and $\beta_m$; m=1; ..., M, are direction cosine vectors pointing from the source location 4 to each of the M sensor locations (vectors 202 depicted in FIG. 2). This expression states that the source location information contained in a direct-path P-S arrival-time difference is provided in the source-sensor direction $\beta_m$. For sources at distances several times the vertical aperture of an array, the set of M such directions will be very similar, providing much information in the mean range direction but little information in orthogonal directions, which typically include depth. This reduction in depth accuracy for distant sources is illustrated in FIG. 2, where the circles of constant range given by a set of direct path arrival-time measurements are shown to intersect a distant source location at very similar, nearly vertical angles, meaning that vertical changes in source location correspond to only small changes in the arrival times observed at the sensors.

More particularly, FIG. 2 shows that for sources at distances several times the vertical aperture of an array 204, all source-sensor direction cosine vectors 202, $\beta_m$, point in nearly the same direction. Thus, direct-path P-S arrival-time differences provide event location information almost entirely in this mean range direction. Partial surfaces of constant arrival-time difference (circles) are represented by lines 206, demonstrating that the total change in the set of arrival times $\delta_D$ will be large for changes in source range, but not for changes in source depth, indicating poor depth accuracy.

The matrix for the Fisher information contained in the set of head-wave P-S arrival-time differences $\delta_H$ can similarly be derived as $$J_\xi(\delta_H) = ESNR_H M \beta_H \beta_H^T, \quad (4)$$

where $ESNR_H$ is the head-wave effective signal-to-noise ratio and $\beta_H$ is a direction cosine vector 116 pointing from the source location to the head-wave-generating interface at the critical angle, $\theta_c$, as depicted in FIG. 1.

Given these descriptions, the geometrical benefit of combining direct-path and head-wave information can be understood intuitively. For example, the information provided by headwave P-S arrival-time differences along $\beta_H$ will typically have a sizable vertical component, providing additional depth accuracy. This information can be interpreted as being provided by a group of virtual sensors located at points along a line from the source in the direction $\beta_H$, through the head-wave-generating interface, and therefore provides an effectively increased vertical array aperture. Additionally, it can be seen that the directionality of the information provided by direct-path and headwave arrivals will tend to be highly complementary because the source-sensor directions $\beta_m$ will typically be quite different from the interface critical-angle direction $\beta_H$ for sources in the region where events cause head waves to be observed at the array. The result of this is that the combination of the two arrival types provides a large reduction in event location uncertainty, as depicted in FIG. 4.

Figure 4:
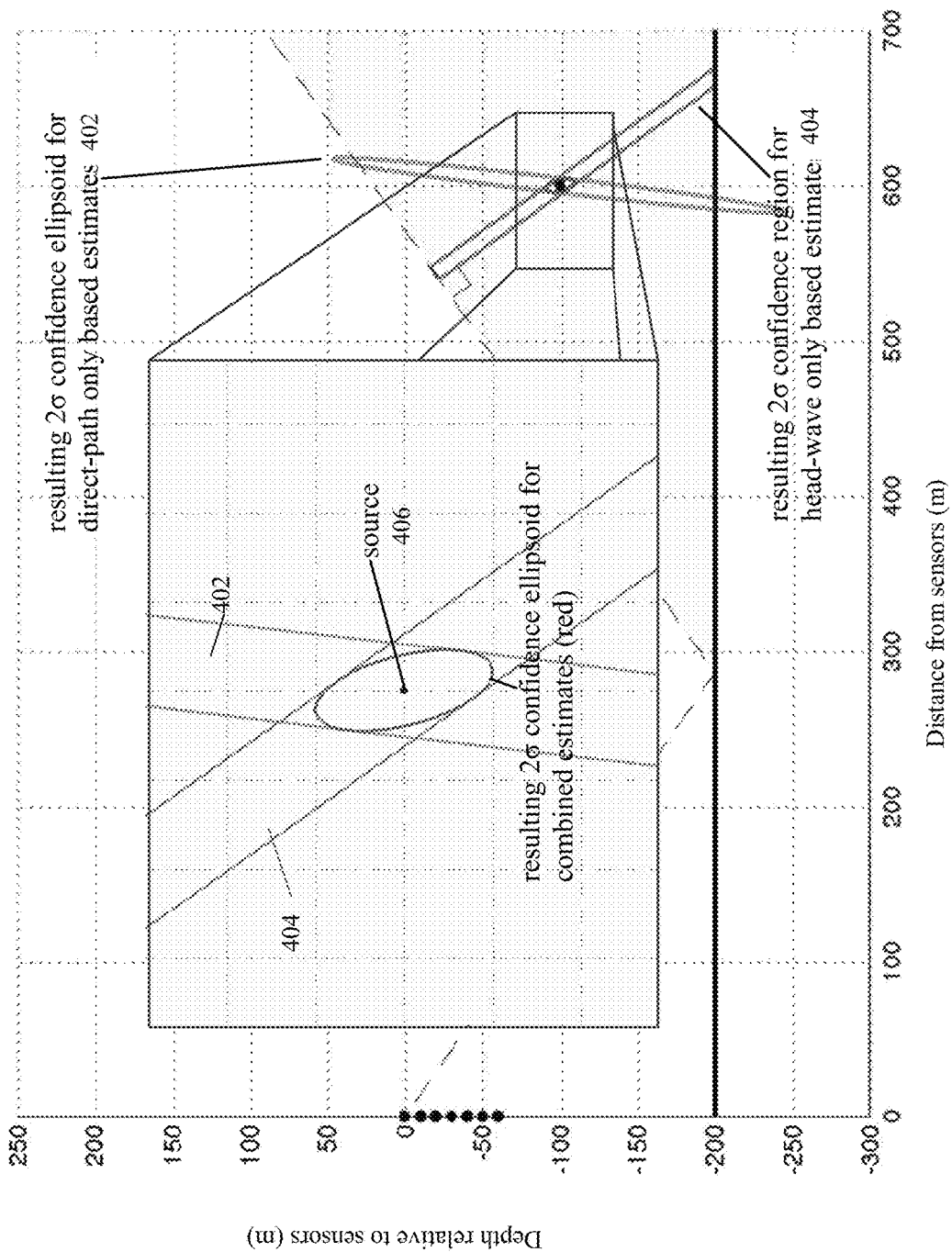
FIG. 4 illustrates typical $2\sigma$ confidence regions plotted for both arrival types used in isolation as well as in combination.

More particularly, FIG. 4 shows that because direct-path and head-wave P-S arrival-time differences provide information along complementary directions, their use in combination allows for greatly improved localization accuracy, particularly in the depth dimension. Here, typical $2\sigma$ confidence regions 402, 404 are plotted for both arrival types (direct-path and head-wave, respectively) used in isolation as well as in combination. These regions 402 and 404 are computed using the arrival times measured at the sensors for both types of waives and methods such as those described in the co-pending applications or other known methods. The intersecting region 406 can also be computed using well-known techniques, resulting in a more highly accurate estimate of the location of a source or microseismic event within the intersecting region 406.

This increase in accuracy is now examined more formally. Assuming that estimates of the direct-path and head-wave arrival waveforms are statistically independent (which might hold only approximately when arrivals overlap), the Fisher information contained in simultaneous measurements of the direct path and head-wave arrivals is the sum of their respective informations, $$J_\xi = J_\xi(\delta_D) + J_\xi(\delta_H). \quad (5)$$

The corresponding lower-bound variance of event location estimates is then given as the inverse of this information, which may be written as the bound variance based on the direct path only, reduced by a positive quantity in the direction $\beta_H$, $$\text{Var}\{\xi\} \geq J_\xi^{-1} = J_D^{-1} - \frac{\alpha M J_D^{-1} \beta_H \beta_H^T J_D^{-1}}{1 + \alpha M \beta_H^T J_D^{-1} \beta_H}, \quad (6)$$

where $J_D$ denotes the position Fisher information based on direct waves, $J_\xi(\delta_D)$, and it is assumed that the head-wave effective signal-to-noise ratio $\text{ESNR}_H$ is a fraction a of the direct-path effective signal-to-noise ratio $\text{ESNR}_D$.

Figure 3:
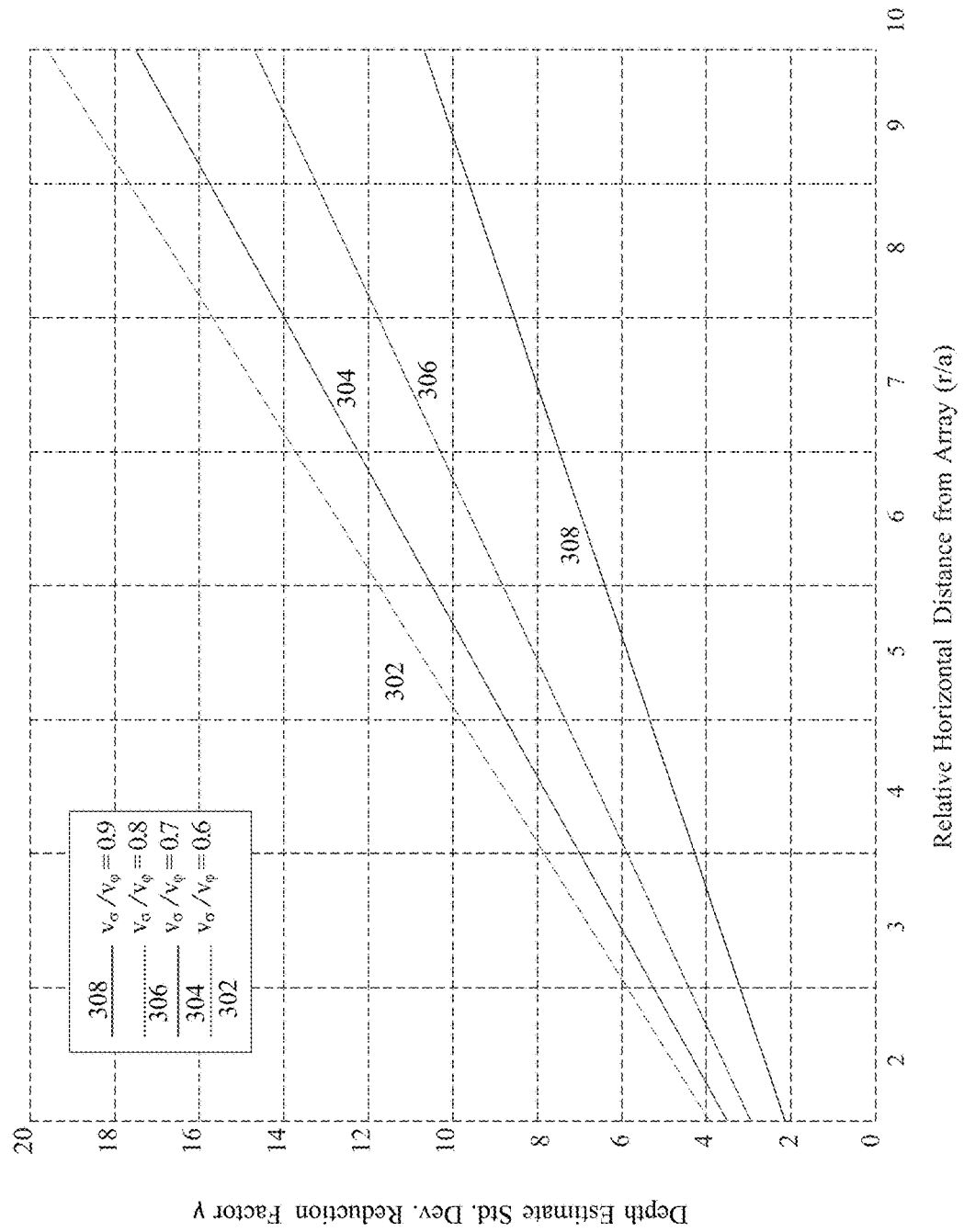
FIG. 3 illustrates an approximate reduction factor $\gamma$ for event depth estimate standard deviation as a function of event horizontal distance r compared to vertical array span a for various interface velocity ratios.

More directly examining the associated improvement in event depth estimation accuracy, it is found that for sources far from and at a similar depth to the sensor array, the depth-estimate lower-bound standard deviation is reduced roughly by a factor $$\gamma = \sqrt{M\alpha}\left(\frac{r}{a}\right)\cos\theta_c \quad (7)$$

when using both arrival types as compared to direct-path only estimates, where r represents an event's horizontal distance from the array, a is the vertical span of the array, and M is the number of sensors in the array. This reduction in depth estimate standard deviation is plotted in FIG. 3, demonstrating that when the critical angle is steep (a high velocity contrast is present, as in line 302) or the source is far from the array, the addition of head-wave information to direct-path information can significantly improve depth estimate accuracy, reducing depth estimation errors by a factor of about 10 for the geometries we've studied. More particularly, FIG. 3 shows lines 302, 304, 306, 308 plotting an approximate reduction factor γ for event depth estimate standard deviation as a function of event horizontal distance r compared to vertical array span a for various interface velocity ratios (0.6, 0.7, 0.8 and 0.9, respectively). A headwave to direct-path ESNR ratio, α, of 0.5 was used in generating these plots. Note the successful detection of a head-wave arrival additionally dictates that the associated event occurred in the slow layer 106, somewhere within the headwave-generating region depicted in FIG. 1.

Thus far only the addition of head-wave P-S arrival-time differences has been discussed. In fact, the direct-path to headwave arrival-time differences also provide information regarding source location, giving that the combined use of all four arrivals (direct-path P and S and head-wave P and S) actually affords an even greater increase in localization accuracy than presented here; however, because this additional information is not independent of the two direct-path and head-wave based informations described here, its consideration yields more complex bound expressions that will not currently be presented. It is worth noting though that any combination of the four arrivals can be used to localize events, each yielding a different amount and spatial distribution of localization uncertainty. Further discussion of multiple-arrival localization will be left for future work.

Figure 5:
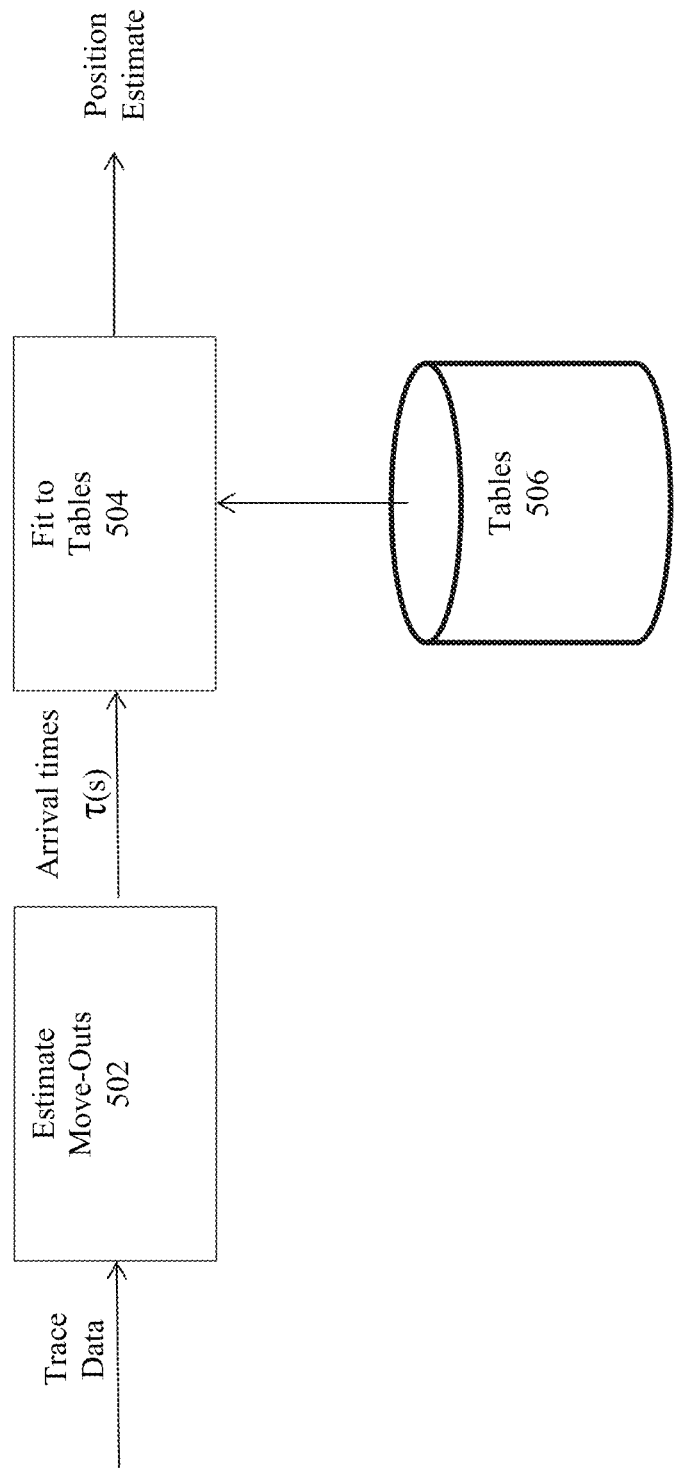
FIG. 5 is an example functional block diagram for estimating the location of a microseismic event using estimated wave arrival times according to aspects of the invention.

Estimating Microseismic Event Locations Using Both Direct and Head Wave Information The location of microseismic events is commonly estimated using a two-step process, as shown in FIG. 5. First, event seismic energy, e.g. a P wave, is detected from trace data (e.g. trace data output from 3C geophones from GeoSpace Technologies) and the trace data is analyzed in block 502 to measure its arrival time τ(m) at each of the sensors (m=1 . . . M) in the array. Then, the measured arrival times are compared in block 504 to tabulated values 506 associated with a grid of possible event locations in range and depth, and the event location producing the best match is the estimate, usually by minimizing the sum of square differences between the measured and tabulated arrival times. Trace data for direct P waves alone, direct S waves alone or both direct P waves and S waves may be detected and used. In any of these cases, the approach is to first measure the arrival times, and then estimate the event position as the one giving the best match between the measured and modeled quantities.

It is often the case that the array has a single, nearly vertical line of sensors (e.g. bi-axial in the horizontal plane), and in this case, the above method of fitting wavefront arrival times produces estimated range and depth and an examination of the polarization of the energy between the two horizontal directions leads to estimated event azimuth. Different array geometries such as multiple offset sensor lines and horizontal arrays provide different geometric leverage, but the least-squares method may still be used.

Figure 6:
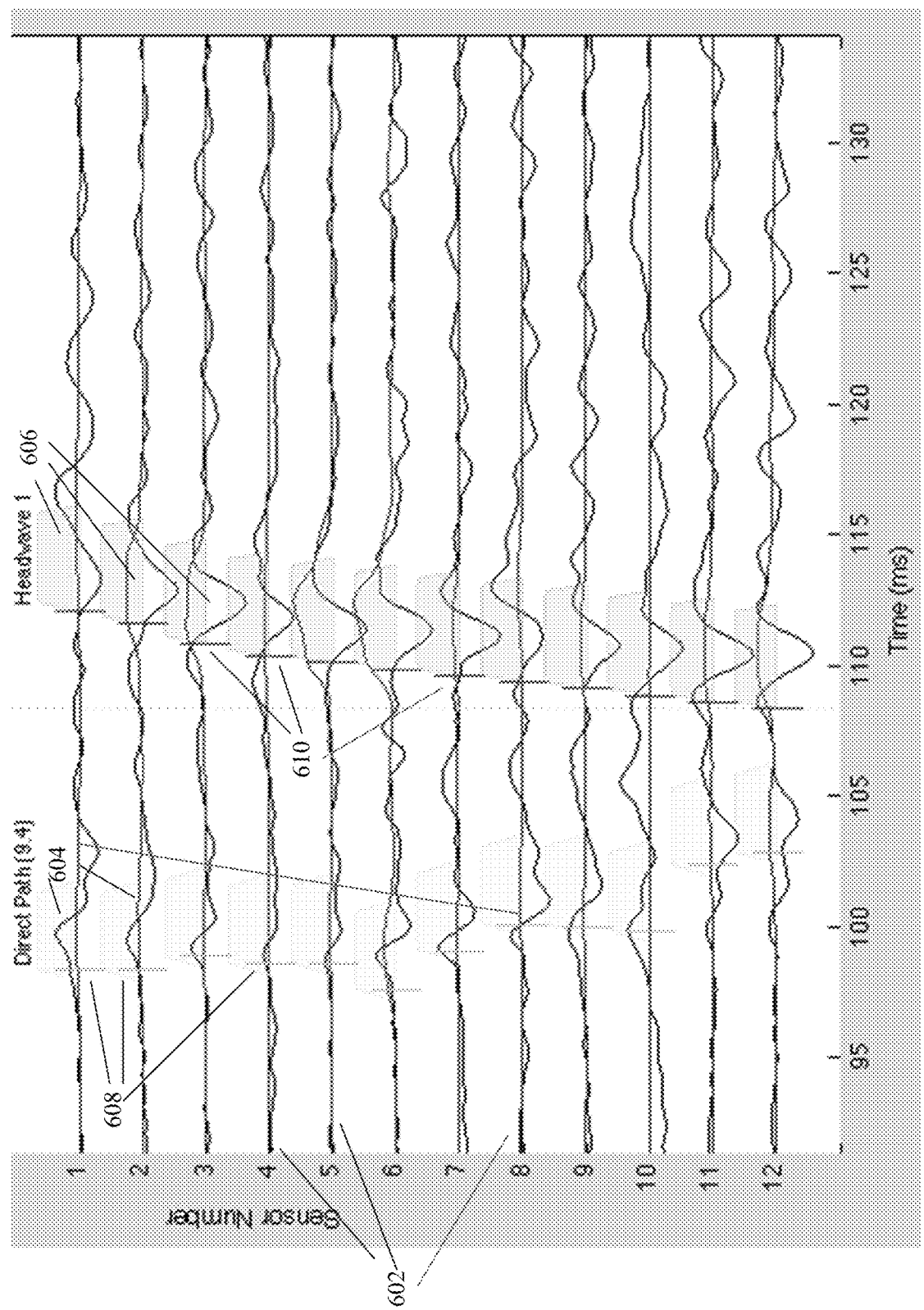
FIG. 6 illustrates example trace data associated with a microseismic event produced by an array of sensors such as geophones.

As shown above, incorporating head wave information together with direct wave information can greatly improve the accuracy of event location estimates. An example of trace data from an array of twelve sensors is shown in FIG. 6. As shown, the trace data 602 from each of the twelve sensors includes both direct wave 604 and head wave information 606 associated with a single microseismic event. This information can be analyzed to estimate the time of arrivals for each of the sensors for both the direct wave 608 and the head wave 610 using known techniques such as those described above.

An example method to incorporate head wave information such as that shown in FIG. 6 in the microseismic event location estimate according to embodiments of the invention will now be described. First, the arrival times 610 of an arriving head wave may be detected and estimated, such as the processing performed in block 502 of FIG. 5, and then the measured arrival times are fit to a model 506 of head wave propagations to estimate the event range and depth, such as that described above in connection with block 504 shown in FIG. 5. Similarly, the horizontal polarization of head waves arriving at a vertical line of sensors is often similar to that of the corresponding direct wave, and the two polarizations can be used together (with a weighting that reflects the accuracy of the respective polarization measurements) to improve the event azimuth estimate. Accordingly, a travel time table for each arriving head wave can be used in conjunction with the travel time tables 506 for the direct waves whose arrival times 608 have also been measured to estimate position by simply adding the direct and head wave travel time square errors, preferably with a weighting reflecting the relative accuracy of the various direct and head wave arrival time measurements 608, 610.

It should be pointed out that while the direct P waves and S waves will not overlap except for sources very close to the array (which would be easy to localize), P-head waves and S-head waves can arrive before, during or after the direct waves, depending on the event distance to the array. Current methods for estimating parameters of P waves and S waves (arrival times and polarizations, that is) take advantage of the fact that they don't overlap, and would break down if they did. (Though P wave reflections may be present during the S wave, they are often much smaller in amplitude compared to the S wave, and don't prevent the S wave parameters from being successfully estimated.) The question then becomes how to estimate the arrival times and polarizations in the presence of head wave arrivals.

Figure 7A:
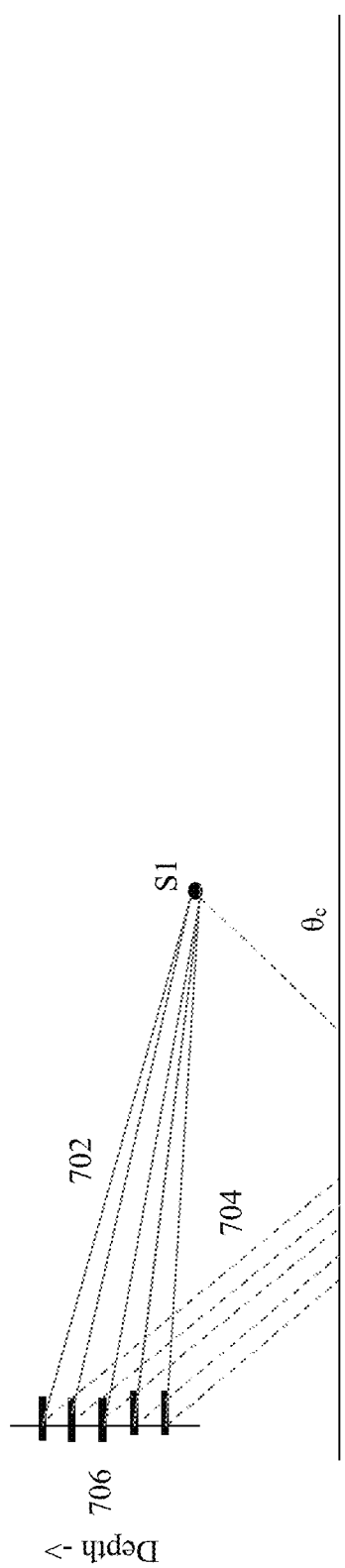
FIGS. 7A to 7D illustrate aspects of estimated arrival times for both direct waves and head waves associated with events that are relatively near and far from a sensor array.

It turns out that head waves have special properties that allow estimation of the direct and head wave parameters, even when there is overlap, as will now be described in connection with FIGS. 7A to 7D. FIG. 7A illustrates direct waves 702 and head waves 704 associated with an event located at S1 arriving at a sensor array 706, and FIG. 7C illustrates the estimated times of arrivals from the trace data 712 from each of the sensors in the array 706 associated with the event located at S1 in FIG. 7A. More particularly, FIG. 7C shows the estimated times of arrivals 714 for the direct waves 702 at each of the sensors in array 706, and the estimated times of arrivals 716 for the head waves 704 at each of the sensors in array 706.

Figure 7B:
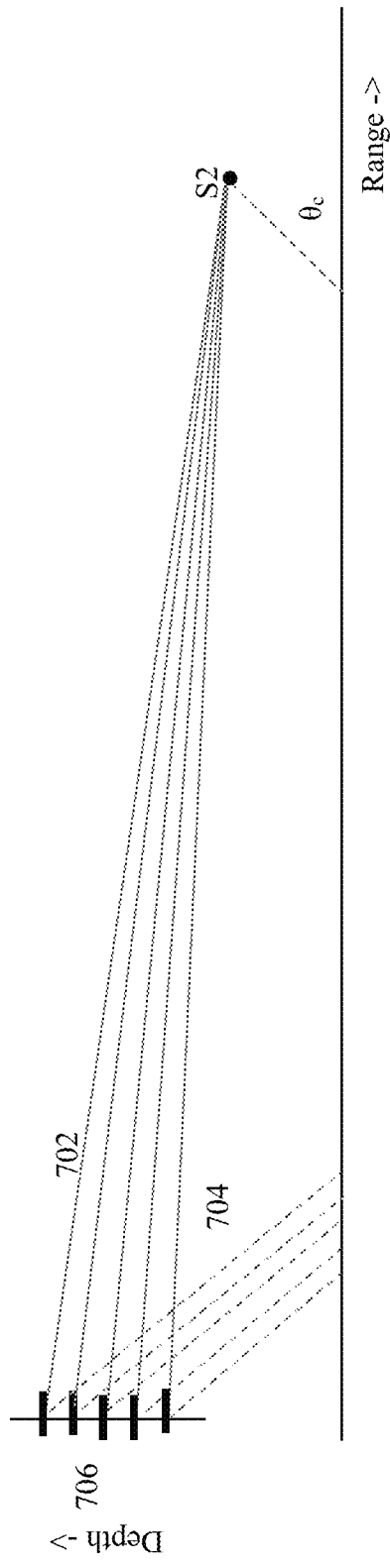
Figure 7C:
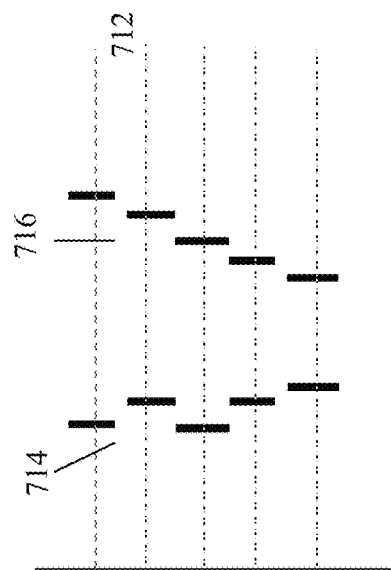
Figure 7D:
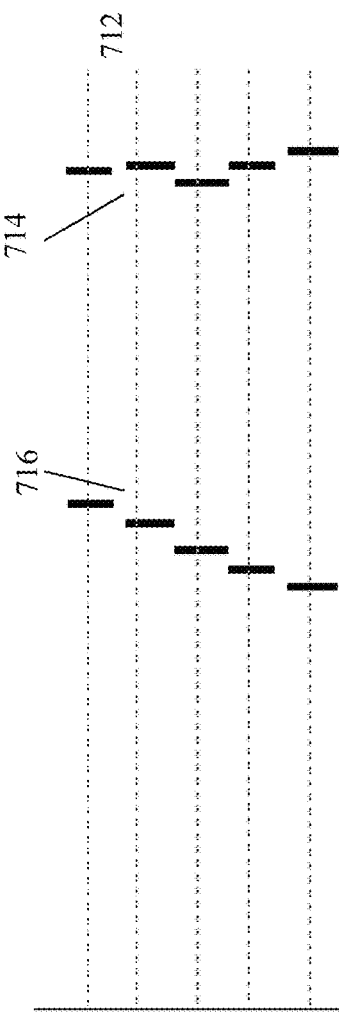
Figure 8:
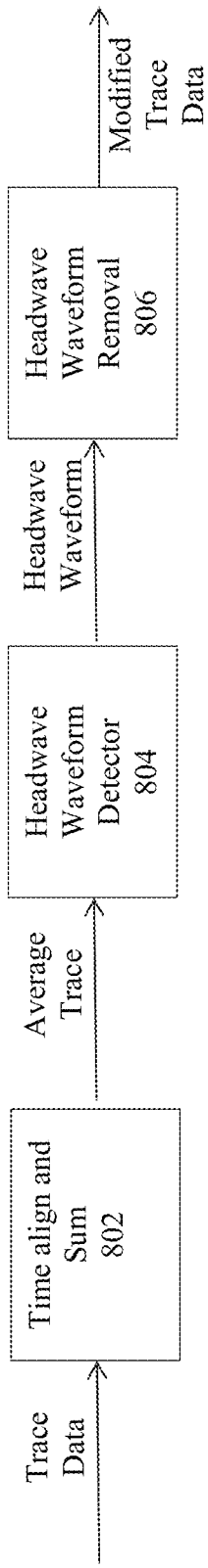
FIG. 8 is an example functional block diagram for removing an estimated head wave associated with a microseismic event from sensor trace data according to embodiments of the invention.

Likewise, FIG. 7B illustrates direct waves 702 and head waves 704 associated with an event located at S2 arriving at a sensor array 706, and FIG. 7D illustrates the estimated times of arrivals from the trace data 712 from each of the sensors in the array 706 associated with the event located at S2 in FIG. 7B. More particularly, FIG. 7D shows the estimated times of arrivals 714 for the direct waves 702 at each of the sensors in array 706, and the estimated times of arrivals 716 for the head waves 704 at each of the sensors in array 706.

As illustrated in FIGS. 7C and 7D, note that the direct wave moveout (i.e. the pattern of arrival times 714) changes, becoming more constant as the source becomes more distant from the array 706 (i.e. S2>>S1). By contrast, the head wave moveout (i.e. the pattern of arrival times 716) is substantially independent of the event position. This is due to the fact that head waves leave their generating layer at the critical angle, irrespective of how (or from where) they reached the the generating layer. More generally (for a non-vertical array, for instance), the moveout generated by a head wave depends only on the local propagation, and not on the event position. It's the overall arrival time relative to other wavefronts that provides the bulk of event location information contained in the head wave.

According to further aspects of the invention, because head wave arrivals have such a predictable moveout as shown in FIGS. 7C and 7D, they can be removed from the seismic trace data as follows. First, the traces are time aligned according to the predicted head wave moveout in block 802. Then block 802 sums the respective sensor axis traces to form a three-axis head wave detection signal. Now block 804 adds the square axis signals to form a detection statistic. Any sufficiently large peaks in the detection statistic are likely to result from head waves and not from seismic background energy. Such detection statistic peak times are the head wave arrival times, and estimates of the corresponding head wave pulses are the respective detection signals, windowed about their arrival times. Since the head wave pulse estimate formed by block 804 is formed by averaging over sensors across the array, even if the head wave overlaps with one of the direct waves, the average will sum different times within the overlapping direct wave, thus reducing its effect on the head wave pulse estimate. The head wave pulse estimate can then be subtracted from each of the traces in block 806—perhaps after adjustment, for instance to account for changes in amplitude or frequency content across the array—to produce a set of modified seismic traces with the head wave removed. Current art methods can then be used with these head-wave-removed traces to produce measurements of direct wave parameters.

EXAMPLES

A microseismic event localization technique utilizing both direct path and head-wave arrivals according to the invention was applied to a data set collected during hydraulic fracture stimulation of the Montney formation in Alberta. The Montney is bounded below by the higher velocity Belloy formation, exhibiting a $v_o/v_\varphi$ ratio of approximately 0.82. A slightly deviated array of 12 3C geophones was used to monitor the stimulation from near the top of the Montney formation, spanning a vertical height of approximately 100 meters, 200 to 300 meters above the Belloy interface. This configuration resulted in clear head-wave arrivals being observed in collected event data for a wide range of event locations, with the majority of high-energy activity occurring at horizontal displacements of 600 to 1000 meters.

Previous analysis of this data set using conventional localization methods had produced event localizations spanning a depth range of 400 meters, with a large number of events being localized within the Belloy. The accuracy of these localizations was questioned because the Belloy was expected to limit fracture growth and has an upper portion that is porous and water bearing, implying that induced connectivity between it and the wells would be expected to cause water production which was not observed following the fracture stimulations. In this case, the use of both arrival types in localization yielded an approximate decrease in depth errors, given by $\gamma$, to about $\frac{1}{10}$ their previous values. Additionally, this multiple-arrival analysis prevented mislocalizations of head-wave arrivals as direct path events, which would have resulted in erroneous localizations deep into the Belloy, and constrained a large number of event locations to the Montney through successful identification of associated head-wave arrivals.

Approximately two-thirds of the events detected in regions exhibiting head-waves had both direct path and head wave arrivals successfully detected and analyzed, resulting in event localizations that were almost entirely constrained to be within the Montney, supporting prior expectations. In particular, event locations tended to cluster in regions of high incoherence, as calculated from a prior seismic survey of the region. Map view results of this reprocessing were quite similar to those of the initial processing, supporting that these improved results were not inconsistent with previous processing, but simply afforded greatly increased depth resolution.

Figure 9:
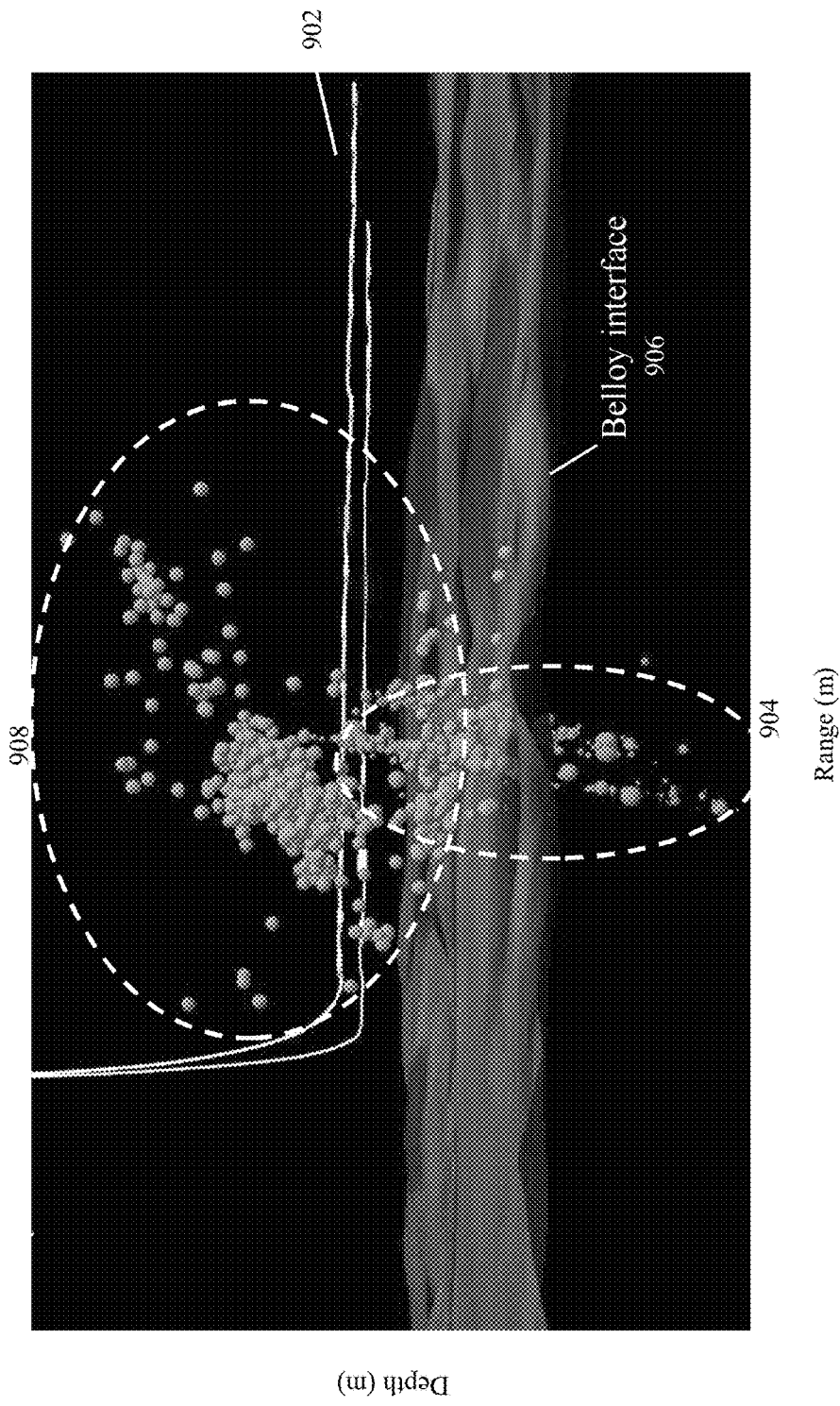
FIG. 9 illustrates an example of conventional and novel microseismic event localizations for a single stage of hydraulic fracture stimulation in the Montney.

FIG. 9 illustrates microseismic event localizations for a single stage of hydraulic fracture stimulation using treatment wells 902 in the Montney. Spheres generally lying within region 904 shown in FIG. 9 depict conventional localization results, exhibiting a large vertical spread that extends far into the high-velocity Belloy layer 906 below. Spheres generally lying within region 908 shown in FIG. 9 depict localization results using both direct-path and head-wave arrivals according to embodiments of the invention, exhibiting activity in the Montney which correlates spatially to regions of high seismic incoherence.

According to certain aspects, the foregoing describes the geometry of head-wave-arrival based localization and, through the application of an analytic probabilistic framework, illustrates how the combined use of these arrivals with direct-path arrivals affords greatly increased accuracy in microseismic event localization, concluding with a brief presentation of localizations made using this approach. The improvement in localization accuracy discussed here serves as one example of how localization accuracy can be improved by analyzing as much observed event energy as possible. Further improvements can be achieved by analysis of other indirect path arrivals such as reflections and mode conversions.

To summarize the foregoing examples, with application of industry standard analysis techniques to a microseismic data set collected during hydraulic fracture stimulation of wells in the Montney, event locations were mapped to a range of depths spanning nearly 400 meters, with a large number of events being located within the Belloy as shown in FIG. 9. These localizations were believed to be incorrect because the Belloy is known to be a water-bearing layer which would have caused the stimulated wells to produce water if the induced fracture network extended into it, and such production of water from the Belloy was not observed. Because the presence of strong head waves in much of the collected data was believed to be a potential cause of these suspect localizations, reprocessing of the data set was performed using techniques described above to detect and use both direct-path and headwave arrivals associated with individual microseismic events during localization. The result of this reprocessing were event locations largely contained within the Montney.

Multi-Path Analysis

Relatedly, and in accordance with certain additional aspects of the invention to be described now in more detail, previous studies have indicated that a correlation exists between seismic attributes such as curvature and incoherence and regions of high microseismic activity observed during hydraulic fracture stimulations. In light of this insight, the correlation between the revised event localizations and these seismic attributes was examined, revealing that a correlation does exist in the presently considered data set and that the growth of the induced fracture network was well predicted by the internal physical structures revealed by these seismic attributes. According to certain aspects, the present inventors have examined the difference in previous and revised localization results and explored the correlation between the revised localizations and computed seismic attributes.

The theory of the localization technique used to generate the revised localizations discussed here has been presented in detail above, using analytic localization uncertainty assessments derived in a manner initial described in U.S. application Ser. No. 13/598,580. Briefly, the position information in any given path from source to sensor is provided along the direction the path leaves the source. The direct paths for a horizontally distant source at a similar depth to the array will point horizontally, with little depth variation. As a result, direct-path based estimates, by themselves, provide accurate horizontal position estimates but uncertain depth estimates. Since head-wave propagation paths leave the source at the generating-interface's critical angle they provide information which complements that provided by the direct path, irrespective of the source position. Thus, significant depth accuracy is achieved in localization by combining the information provided by these multiple paths. This geometry is illustrated in FIG. 4, which depicts improved localization accuracy achieved by using both direct-path and head-wave arrivals according to previously described aspects of the invention.

Additionally, the present inventors recognize that curvature and seismic incoherence reveal much about stratigraphic features and physical structures contained in local geology. These seismic attributes will be compared visually to the revised event locations in the context of a 3D seismic volume to examine the influence of these physical structures on the location of regions where microseismic activity is predominantly induced during hydraulic fracture stimulation.

EXAMPLES

The above described multipath-analysis microseismic localization technique was applied to a data set collected during hydraulic fracture stimulation of the Montney formation in Alberta. The Montney is bounded below by the higher-velocity Belloy formation. A slightly deviated array of 12 3C geophones was used to monitor the stimulation from near the top of the Montney formation, spanning a vertical height of approximately 100 meters, 200 to 300 meters above the Belloy interface. This configuration resulted in clear head-wave arrivals being observed in collected event data for a wide range of event locations, with the majority of high-energy activity occurring at horizontal displacements of 600 to 1000 meters.

Figure 10:
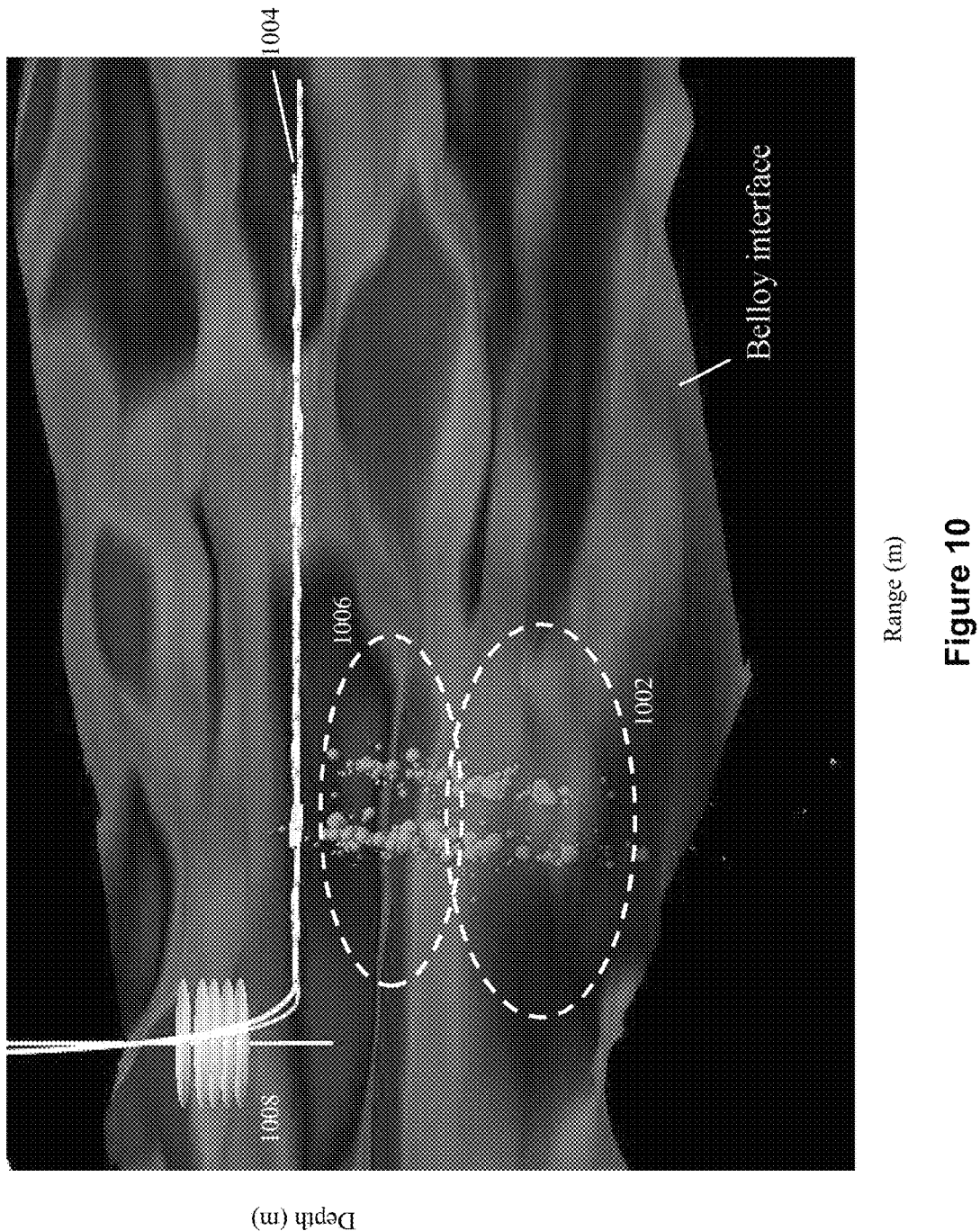
FIG. 10 illustrates original processed microseismic events.

This survey was first processed using industry standard techniques without accounting for head waves from the deeper fast layer associated with the Belloy formation. As described above in connection with FIG. 9, these microseismic analysis results show events spanning 400 meters vertically and extending into the Belloy, contradicting the fact that no water from the Belloy was observed to be produced by the stimulated wells. In this standard microseismic analysis, events are being placed on a vector plane which underestimates the velocity below the source and therefore places events below the treating well. More particularly, FIG. 10 shows original processed microseismic events (spheres generally lying within region 1002). Data points are found below the treating well 1004 and continue below the Belloy depth surface. The Belloy is semi-transparent and colored using a measure of positive curvature where areas 1006 have the largest positive value. Disks 1008 on the vertical well represent selected horizon picks from the input model.

Figure 11:
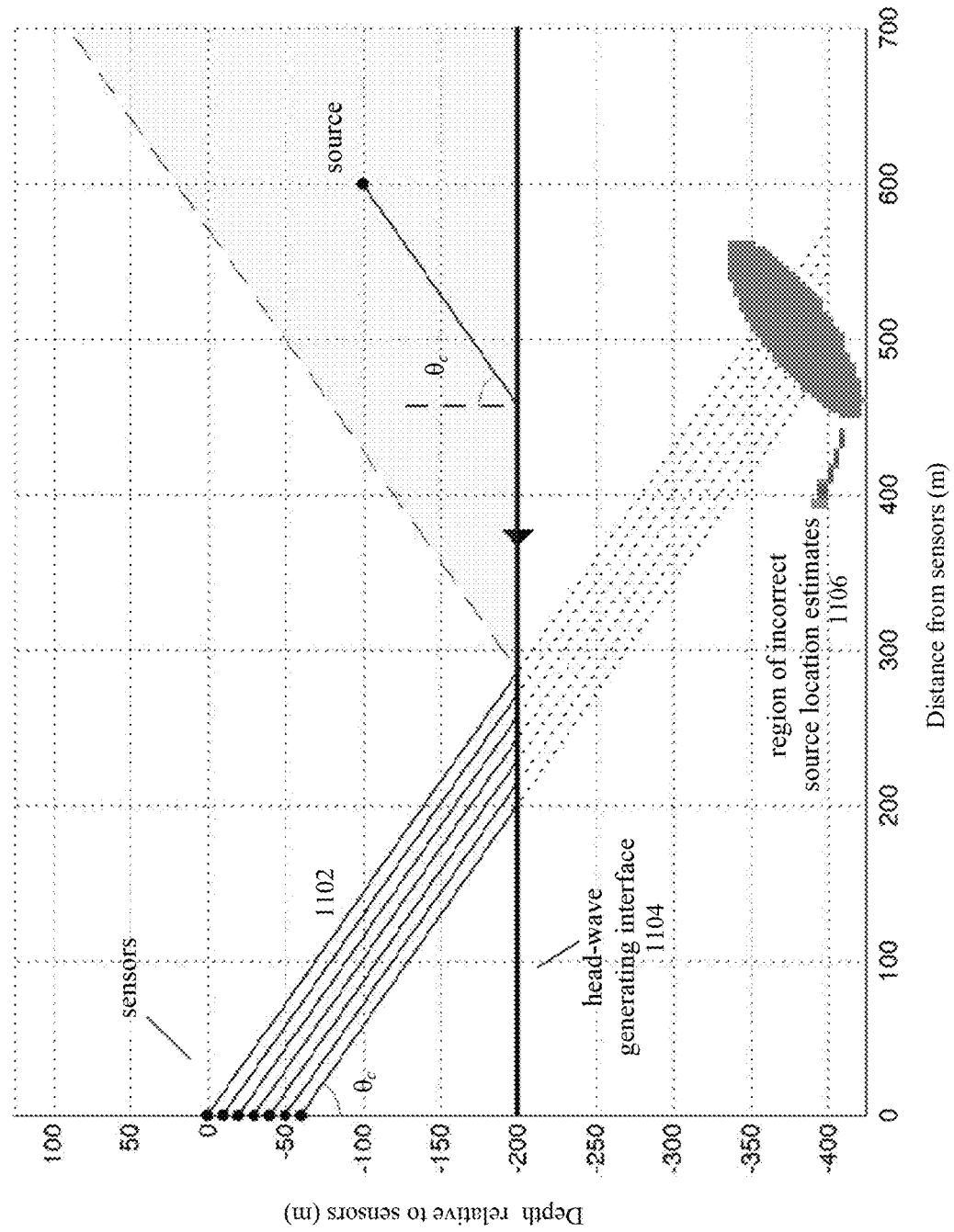
FIG. 11 illustrates head waves generated when a portion of the wavefront created by a microseismic event hits an interface with a higher-velocity layer at the critical angle, $\theta c$.

In addition, it seems that many head-wave arrivals are incorrectly identified as direct-path arrivals and located as originating from within the Belloy, as depicted in FIG. 11. More particularly, FIG. 11 shows head waves 1102 are generated when a portion of the wavefront created by a microseismic event 1104 hits an interface 1104 with a higher-velocity layer at the critical angle, $\theta_c$, and then travels a critically-refracted path along the interface, radiating a head wave back into the lower-velocity layer in the form of a plane wave traveling at the critical angle. If the interface is not accounted for and this wavefront is incorrectly detected as a direct-path arrival, it will cause erroneous localizations of events as occurring deep in a region 1106 within the high-velocity layer.

Figure 12:
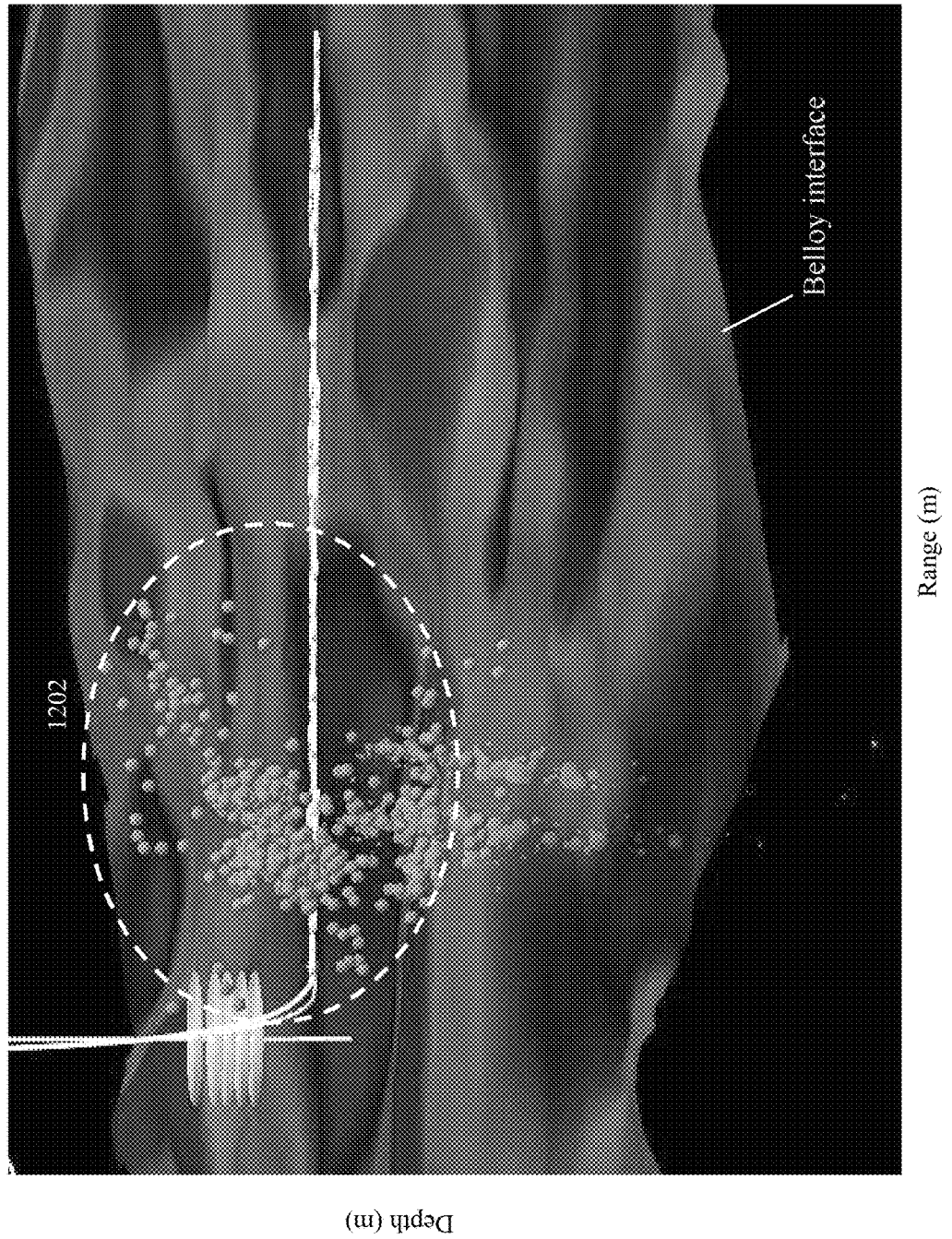
FIG. 12 illustrates new processed microseismic events, as compared with original processed microseismic events.

In the current multipath analysis, the present inventors account for the presence of head waves as expected from the local geology. Application of this technique produces localizations contained within the Montney as expected (see FIG. 12). More particularly, FIG. 12 shows new processed microseismic events (generally lying within region 1202 in FIG. 12), as compared with original processed microseismic events (generally lying within region 1204). New event positions are found to exist within the bounds of the Montney formation and do not extend down into the Belloy depth surface.

Although not depicted here, it should be pointed out that the horizontal plane positions produced by the two methods are similar, consistent with the notion that the incorporation of head-wave information provides increased depth accuracy in the current survey geometry.

Figure 13:
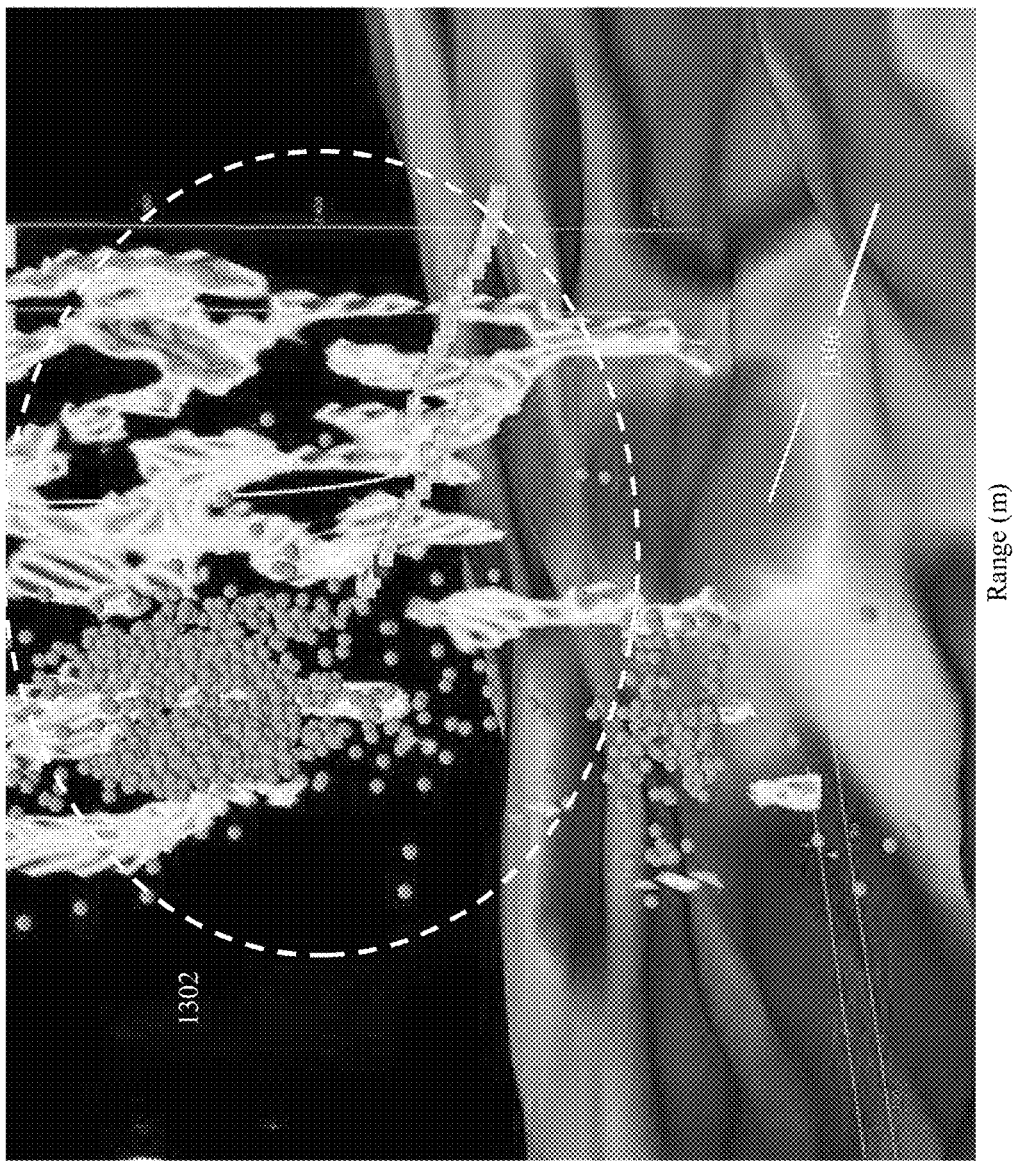
FIG. 13 illustrates an image of the incoherence volume and the new processed microseismic events according to embodiments of the invention.
Figure 14:
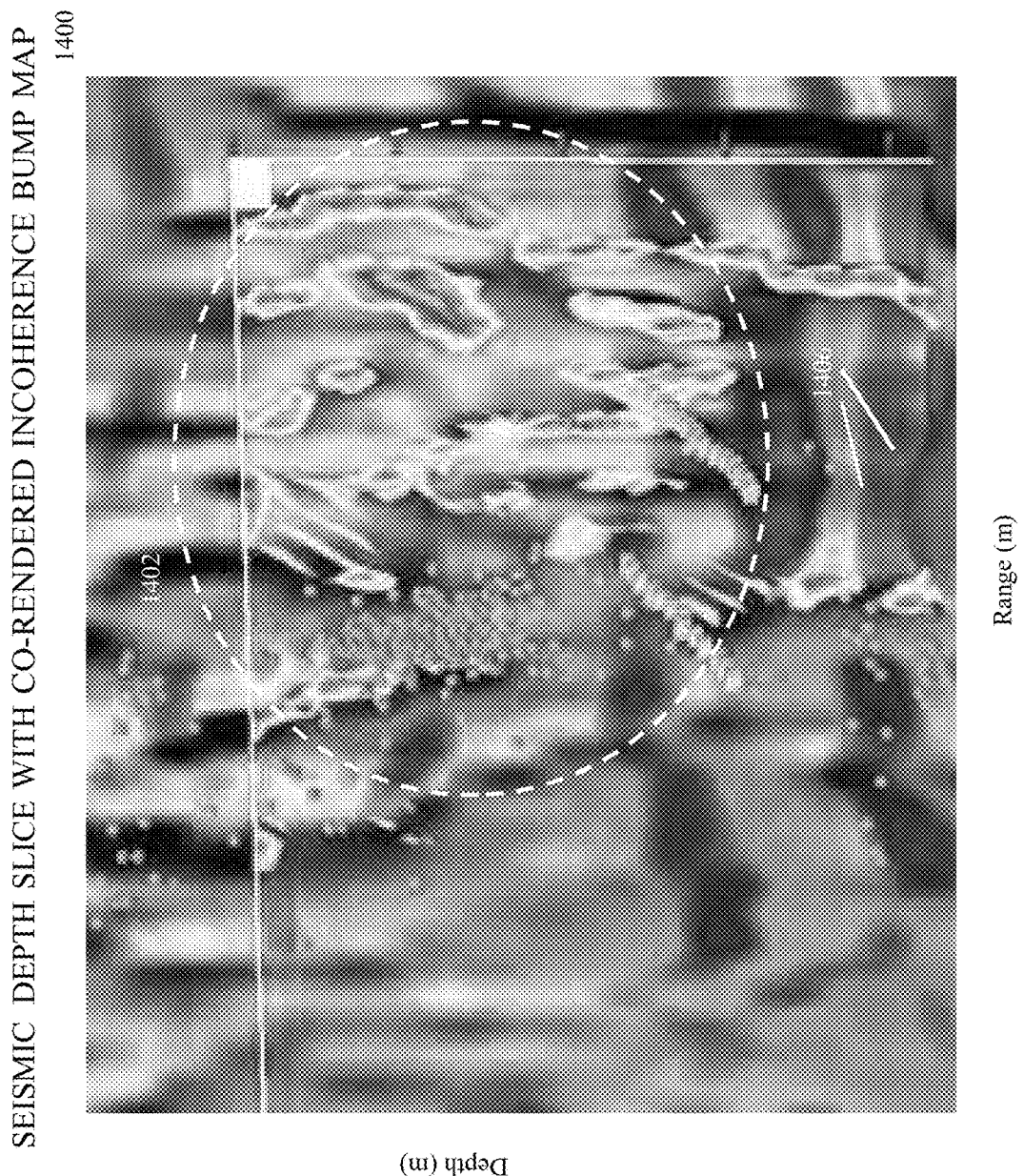
FIG. 14 illustrates seismic depth slice with incoherence bump map co-rendered on its surface according to embodiments of the invention.

Finally, interpreting the results of the new microseismic analysis via comparison with physical structures in the 3D depth volume will be discussed. Referring to FIGS. 13 and 14, areas of incoherence appear to accumulate over the top of the positive curvature event seen in the Belloy. Further, a correlation is seen to exist between the position of the vertically radiating incoherence events and the microseismic event locations.

More particularly, FIG. 13 shows an image of the incoherence volume 1302 and the new processed microseismic events (generally lying within region 1304 in FIG. 13). The Belloy depth surface is colored with positive curvature shown as areas 1306. FIG. 14 shows a seismic depth slice with incoherence bump map co-rendered on its surface. In the foreground is the incoherence volume 1402 and the new processed microseismic events (generally lying within region 1404). The Belloy depth surface is colored with positive curvature shown as areas 1406.

According to certain aspects, the invention analyzes the localization results of the novel microseismic analysis technique described above in the context of a 3D seismic depth volume, demonstrating that the localizations provided by this technique exhibit a correlation to the calculated seismic attributes of curvature and incoherence as shown in FIGS. 13 and 14. Because these seismic attributes have been observed to influence microseismic activity in other shale formations and the localization technique applied was expected to yield more accurate results than industry standard techniques, the spatial correlation observed for these new localizations simultaneously suggests that the examined seismic attributes may be used in well planning to predict the behavior of stimulated fracture network growth and that the localization results, performed using both direct-path and headwave arrivals, did in fact yield an increase in accuracy adequate to reveal the influence of these seismic attributes.

Based on the foregoing descriptions, those skilled in the art will understand how to implement the methodologies of the invention using software programs executing on a computer, or using any suitable combination of software and hardware, and so further details thereof will be omitted here for purposes of clarity of the invention. Those skilled in the art will further understand that the methodologies of the invention can be used to estimate microseismic event locations in real-time (e.g. from real-time computer software analysis of data output from geophones such as 3C geophones from GeoSpace Technologies) or post-hoc analyses of stored sensor data.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

The invention claimed is:

1. A method for localizing a microseismic event producing microseismic energy arriving at a plurality of sensors comprising:
    receiving data corresponding to the microseismic energy at the plurality of sensors, the microseismic energy being associated with the microseismic event in connection with a microseismic survey of a subsurface region;
    identifying a direct wave arrival of the event at each of the sensors in the data so as to obtain information about the identified direct wave arrivals at each of the sensors;
    identifying a head wave arrival of the event at each of the sensors in the data so as to obtain information about the identified head wave arrivals at each of the sensors; and
    comparing, by a computer, the information about both the identified direct wave arrivals and head wave arrivals with tabulated values associated with a grid of possible event locations to determine an estimate of a location of the event,
    wherein the information includes respective times of the direct wave and head wave arrivals at each of the sensors, the method further comprising:
    identifying a predicted moveout of the identified head wave arrivals across the plurality of sensors;
    time aligning traces of each of the plurality of sensors using the predicted moveout; and
    processing the time aligned traces to estimate a head wave waveform.

2. The method of claim 1 further comprising fitting the times of the direct wave and head wave arrivals to models to determine the estimate of the location.

3. The method of claim 2, wherein fitting includes minimizing a sum of square differences between the estimated times of direct wave and head wave arrivals and tabulated arrival times.

4. The method of claim 3, further comprising adding together the sum of square differences for the direct wave and head wave arrivals.

5. The method of claim 1, further comprising:
    using the predicted moveout to determine the times of the head wave arrivals.

6. The method of claim 1, further comprising subtracting the estimate of the head wave waveform from the data based on the identified head wave arrivals.

7. The method of claim 1 further comprising subtracting the estimated head wave waveform from the data.

8. The method of claim 7, further comprising producing a set of modified traces for each of the plurality of sensors based on the subtracting.

9. A method for localizing a microseismic event producing microseismic energy arriving at a plurality of sensors comprising:
    receiving data corresponding to the microseismic energy at the plurality of sensors, the microseismic energy being associated with the microseismic event in connection with a microseismic survey of a subsurface region;
    identifying a predicted moveout of head wave arrivals across the plurality of sensors;
    using the predicted moveout to determine estimated times of head wave arrivals in the data;
    processing the data using the estimated times of head wave arrivals to estimate a head wave waveform associated with one of the sensors;
    subtracting the estimated head wave waveform from the data to obtain a modified trace for the associated sensor; and
    analyzing the modified trace to estimate a location of the microseismic event.

\* \* \* \* \*